June 9, 1931. J. P. FEDOR 1,808,842
AEROPLANE WING
Filed Aug. 18, 1930
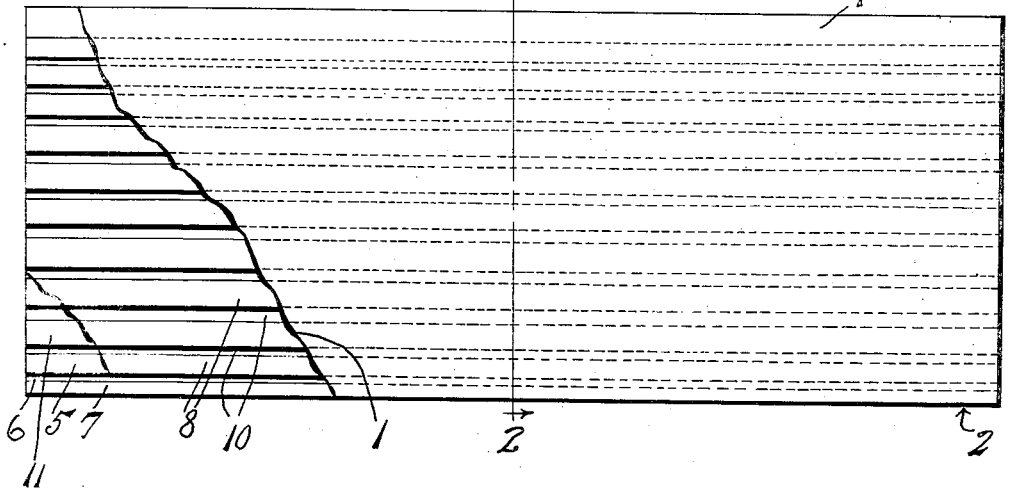
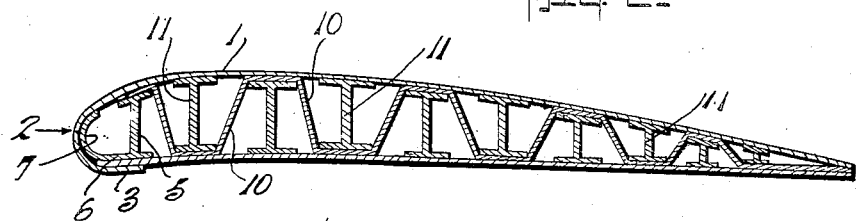
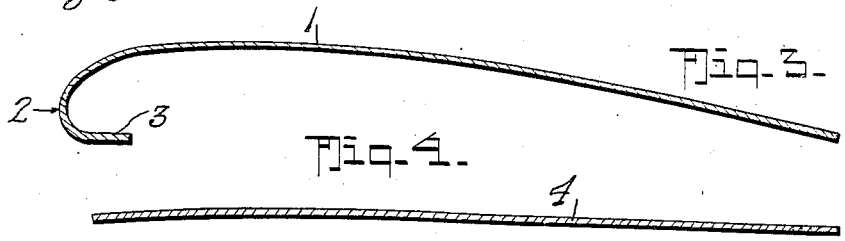
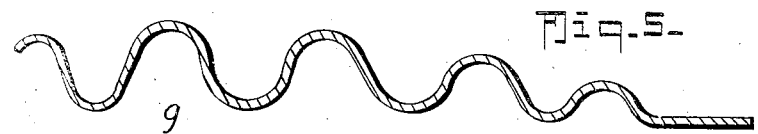
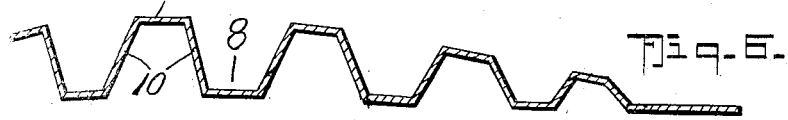
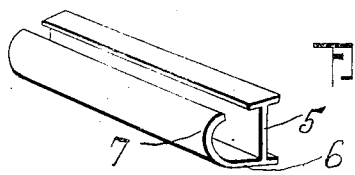
INVENTOR
J. P. Fedor.
BY
ATTORNEY Patented June 9, 1931

1,808,842

UNITED STATES PATENT OFFICE

JOHN PAUL FEDOR, OF NEW CASTLE, INDIANA

AEROPLANE WING

Application filed August 18, 1930. Serial No. 476,101.

My invention relates to all metal construction of airfoils and it particularly has for an object to provide an improved construction of aeroplane wing in which a maximum safety factor is present.

Further, it is an object of the invention to provide a simplified construction in which there is a minimum of detail while the safety factor is kept at a maximum.

Further, it is an object to provide a wing construction which is economical to manufacture, one which will withstand the terrific strains such as are encountered by the wings of pursuit planes turning at right angles or less at full speed ahead.

Further, it is an object to provide a structure that is suitable for thin wings and yet maintain the much desired safety factor.

Further, it is an object to provide a wing structure free from physical weaknesses such as are caused by bolting or riveting several details together to form a single member.

A further object is to provide a wing, the main body of which contains no bolts, nuts or rivets, which are subject to wear or liable to become loosened by vibrations or strains.

Further, it is an object to provide a wing in which as a unit a zigzag member supports I-beams and I-beams in turn support the zigzag member, which forms a plurality of V-shaped ribs parallel to the central longitudinal line of the wing and extending from tip to tip.

Further, it is an object to provide a wing of such construction and design that no internal anvil or support for the electrical spot-welding operation is necessary since the I-beams support the structure for that operation.

Further, it is an object to produce a wing in which each I-beam can be separately tested for strength, flaws, size, and other desirable tests made before assembly, thereby giving a reasonable estimate of the total strength and safety of the wing before assembly.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings, in which:—

Figure 1 is a plan view of a wing embodying the invention, a portion of the top covering being broken away.

Figure 2 is a cross section on the line 2—2 of Figure 1.

Figure 3 is a cross section through the top or covering detail.

Figure 4 is a cross section through the bottom covering detail.

Figure 5 is a cross section of the zigzag bracing member in its first step of formation.

Figure 6 is a detail cross section of the zigzag bracing member in its finished form.

Figure 7 is a detail section perspective view of the leading edge I-beam and brace member.

In the drawings, in which like numerals of reference indicate like parts in all of the figures, 1 represents the top covering sheet which is of proper curvature and has its leading edge 2 bent under as at 3 to overlap the bottom cover or sheet 4. Between the sheets 1 and 4 lies the framing which consists of a front I-beam and brace member 5, the lower flange 6 of which is extended forwardly and curved upwardly as at 7 to brace the curve of the leading edge 2 of the top covering 1.

A series of I-beams 11 of proper size parallel the I-beam 5 and are spaced apart at intervals from the leading to the trailing edge of the wing. 8 designates a zigzag brace sheet which overlies and underlies alternate I-beams 5 and 11 as best shown in Figure 2 of the drawings. The zigzag brace sheet 8 has the upper and lower flat portions 9 to engage the I-beams and the diagonal portions 10 which extend from one flat portion 9 to the next flat portion 9 and constitute zigzag braces between the respective I-beams.

When the parts have been assembled as shown in Figure 2, they are spot-welded together into an integral rigid structure.

It will be seen that alternate I-beams are directly welded to the top surface 1 while the others are directly welded to the bottom surface 4. The flat portions 9 of the zigzag member 8 are welded to the I-beams and to the adjacent top and bottom surfaces 1 and 4 where they contact. The underlying portion 3 of the top surface 1 is welded to the under surface 4 and to the reinforce or bracing member 7 of the I-beams.

Thus, it will be seen that a structure is provided that will be strong, composed of the fewest possible number of parts, with maximum factor of safety.

In forming the zigzag member 8 a sheet of metal is first rolled into a cross section such as indicated in Figure 5 and then passed through a second set of rollers by which the final form shown in Figure 6 is given to the plate. In this way the drawing of the metal into form does not result in weakening its structure at any point.

From the foregoing description, taken in connection with the accompanying drawings, it is thought the complete construction, operation and advantages of my invention will be clear to those skilled in the art to which it relates.

What I claim is:

1. In all metal airfolds, a top covering having its leading edge turned under, a bottom covering having its leading edge secured to the turned under part of the leading edge of the top covering, a set of spaced I-beams paralleling the longitudinal center line of the wing and located between said top and bottom coverings, and a zigzag bracing sheet extending alternately over and under successive I-beams from the leading to the trailing edge of the wing and located between said top and bottom coverings, and means permanently securing the aforesaid parts together as an integral structure.

2. In all metal aeroplane wings, top and bottom covering sheets and a structure spacing the same apart, said structure comprising a set of parallel I-beams running the length of the wing and a zigzag sheet brace of approximately the length and width of the wing and passing alternately over and under successive I-beams, and means permanently securing the aforesaid parts together.

3. In all metal aeroplane wings, top and bottom covering sheets and a structure spacing the same apart, said structure comprising a set of parallel I-beams running the length of the wing and a zigzag sheet brace of approximately the length and width of the wing and passing alternately over and under successive I-beams, the I-beam adjacent the leading edge having one of its flanges extended to reinforce the leading edge of said top covering sheet, said I-beams and said zigzag sheets being welded together into an integral structure with said top and bottom cover sheets.

4. In aeroplane wings, a frame composed of parallelly disposed I-beams extending lengthwise of the wing and a zigzag sheet extending transversely of the wing from one end to the other and alternately passing over and under said I-beams, said zigzag sheet and said I-beams being welded together into an integral structure.

5. In aeroplane wings, a frame composed of parallelly disposed I-beams extending lengthwise of the wing and a zigzag sheet extending transversely of the wing from one end to the other and alternately passing over and under said I-beams, said zigzag sheet and said I-beams being welded together into an integral structure, and top and bottom covering sheets enclosing said frame, and means securing said sheets to said frame.

6. In aeroplane wings, a frame composed of parallelly disposed I-beams extending lengthwise of the wing and a zigzag sheet extending transversely of the wing from one end to the other and alternately passing over and under said I-beams, said zigzag sheet and said I-beams being welded together into an integral structure, and top and bottom covering sheets enclosing said frame, and means securing said sheets to said frame, one of said covering sheets having its leading edge portion curved over to lap the adjacent edge of the other covering sheet, and the I-beam at the leading edge having a curved reinforcing extension cooperating with said curved leading edge portion.

JOHN PAUL FEDOR.